United States Patent [19]
Woudenberg et al.

[11] Patent Number: 5,908,916
[45] Date of Patent: Jun. 1, 1999

[54] CROSS-LINKED OR CROSS-LINKABLE OPTICAL POLYCARBONATES AND OPTICAL COMPONENTS COMPRISING SAID OPTICAL POLYCARBONATES

[75] Inventors: Richard Herman Woudenberg, Elst; Tjerk Oedse Boonstra, Duiven; David van Olden, Zevenaar, all of Netherlands

[73] Assignee: Akzo Nobel N.V., Arnhem, Netherlands

[21] Appl. No.: 08/750,284

[22] PCT Filed: Mar. 11, 1996

[86] PCT No.: PCT/EP96/01101

§ 371 Date: Mar. 7, 1997

§ 102(e) Date: Mar. 7, 1997

[87] PCT Pub. No.: WO96/28493

PCT Pub. Date: Sep. 19, 1996

[30] Foreign Application Priority Data

Mar. 13, 1995 [EP] European Pat. Off. .............. 95200598
Jun. 28, 1995 [EP] European Pat. Off. .............. 95201761

[51] Int. Cl.⁶ .................................................. C08G 64/00
[52] U.S. Cl. ............................................................ 528/196
[58] Field of Search ............................................... 528/196

[56] References Cited

U.S. PATENT DOCUMENTS

| 3,124,554 | 3/1964 | Schnell et al. ........................... 528/176 |
| 5,142,605 | 8/1992 | Diemeer et al. ......................... 385/130 |
| 5,208,299 | 5/1993 | Bales et al. .............................. 525/437 |

FOREIGN PATENT DOCUMENTS

| 645413 | 3/1995 | European Pat. Off. ......... C08G 64/16 |
| WO 91/03002 | 3/1991 | WIPO ................................. G02F 1/35 |
| WO 91/18939 | 12/1991 | WIPO ........................... G08G 63/195 |
| WO 95/11476 | 4/1995 | WIPO ................................. G02F 1/35 |
| WO 96/03674 | 2/1996 | WIPO ................................. G02F 1/35 |
| WO 96/28757 | 9/1996 | WIPO ................................. G02F 1/35 |

OTHER PUBLICATIONS

"Polycarbonates", Kirk–Othmer Encyclopedia of Chemical Technology, Third Edition, vol. 18, pp. 491–492 (1982).
"Polycarbonates", Encyclopedia of Polymer Science and Engineering, vol. 11, pp. 680–687 (1982).

Primary Examiner—Terressa Mosley
Attorney, Agent, or Firm—Richard P. Fennelly

[57] ABSTRACT

The present invention is in the field of optical polymers, more particularly, optical polycarbonates for use in optical components.

The present invention provides a cross-linkable or cross-linked optical polycarbonate built up from a monomer mixture comprising:

compounds according to formula 1:

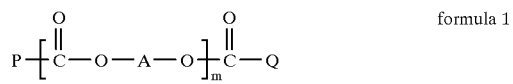

formula 1 wherein: P stands for —Cl, O—R, an imidazole group or —O—Ph,

Q stands for —Cl, O—R, an imidazole group or —O—Ph,

R stands for an alkylene group having 1–6 carbon atoms,

Ph stands for phenyl,

A stands for —Ph—, halogenated —Ph—, (halo)alkyl substituted —Ph, —Ph—Ph—, halogenated —Ph—Ph, —Ph—C(CH$_3$)$_2$—Ph—, —Ph—SO$_2$—Ph—, —Ph—C(CF$_3$)—Ph—, halogenated —Ph—C(CH$_3$)$_2$—Ph, halogenated —Ph—C(CF$_3$)$_2$—Ph, phenolphtalein, —Ph—C(Ph)$_2$—Ph, m is an integer from 0 to 5, with the A-groups being the same or different, optionally, diols, optionally, a dihydroxy-functionalised NLO-compound, and 2,3 dihydroxy propyl methacrylate as a crosslinker.

8 Claims, No Drawings

CROSS-LINKED OR CROSS-LINKABLE OPTICAL POLYCARBONATES AND OPTICAL COMPONENTS COMPRISING SAID OPTICAL POLYCARBONATES

The present invention is in the field of optical polymers, more particularly, optical polycarbonates for use in optical components. In the field of optical polymers polycarbonates are preferred in view of their low light absorbance in the wavelength area for optical uses (1300–1600 nm), making it possible to obtain optical components with low light loss.

Polymeric optical components usually have a multilayer polymer structure one a substrate with a guiding layer (the core clayer) sandwiched between two polymer layers of a lower refractive index (cladding layers). Said layer structure can be formed conveniently by applying the various subsequent layers in the form of a solution, e.g., by means of spincoating, followed by evaporation of the solvent. However, in spincoating layer-on-layer it was found that the first polycarbonate layer re-dissolves when the next layer is applied onto it. As it is essential for optical components to have a specific layer structure with each layer having a specific refractive index and layer thickness, this re-dissolving of the layers is a serious problem: since no well-defined refractive index contrast and specific layer thicknesses can be obtained, the light travelling through the component is not confined within the core layer, resulting in substantial light losses.

In EP-A1-0 645 413 NLO polycarbonates are described. In order to solve the layer-on-layer spincoating problem, it is suggested here to introduce polyisocyanates or polyepoxides into the polycarbonate as cross-linkers. However, it proved quite hard to make a polycarbonate cross-linkable without detrimentally influencing the properties which determine the applicability of optical polycarbonates in optical components, such as Tg, refractive index, light loss, etc. For instance, it was found that the use of Desmodur N®, a polyisocyanate, posed problems due to swelling of the layers. Furthermore, it was found that even after curing the polycarbonate was still partly soluble in the spincoating solvent. Also, the use of polyepoxides was not optimal: it was found that the layers could not be reproducibly obtained: some of the layers were sound but others appeared to have cracks.

The present invention provides a cross-linkable or cross-linked optical polycarbonate wherein the properties determining the applicability in optical components are detrimentally affected hardly if at all, and the layers can be applied on top of each other without re-dissolving of the first layer.

For this reason the cross-linkable or cross-linked optical polycarbonate according to the invention is obtained from a monomer mixture comprising:

compounds according to formula 1:

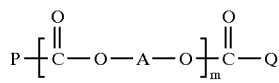

formula 1 wherein: P stands for —Cl, O—R, an imidazole group or —O—Ph,
Q stands for —Cl, O—R, an imidazole group or —O—Ph,
R stands for an alkylene group having 1–6 carbon atoms,
Ph stands for phenyl,
A stands for —Ph—, halogenated —Ph—, (halo)alkyl substituted —Ph, —Ph—Ph—, halogenated —Ph— Ph, —Ph—C(CH$_3$)$_2$—Ph—, —Ph—SO$_2$—Ph—, —Ph—C(CF$_3$)$_2$—Ph—, halogenated —Ph— C(CH$_3$)$_2$—Ph, halogenated —Ph—C(CF$_3$)$_2$—Ph, phenolphthalein, —Ph—C(Ph)$_2$—Ph,
m is an integer from 0 to 5, with the A-groups being the same or different,
optionally, diols,
optionally, a dihydroxy-functionalised NLO-compound, and
2,3 dihydroxy propyl methacrylate as a crosslinker.

With the use of 2,3 dihydroxy propyl methacrylate as a cross-linker, polymerisation can take place separately from curing (cross-linking). The polymerisation reaction of the polycarbonates can take place at approximately room temperature, while the curing reaction is performed either thermally (50 to 220° C., depending on the initiator used) or via photocuring with irradiation (UV or visible light).

The optical polycarbonate according to the invention can be applied in a conventional way, for instance by spincoating. After (or during) evaporation of the spincoating solvent, the layer can be cured, so that the next layer can be applied without any problem.

For thermal curing radical initiators, for instance, peroxides such as dicumyl peroxide, ditert. butyl peroxide, dilauroyl peroxide and dibenzoyl peroxide, azobisisobutyronitrile (AIBN) etcetera, can be included in the spincoating solution. Suitable photoinitiators are for instance Irgacures ®, ex Ciba Geigy and Darocures ®, Ex Merck. The initiators are usually present in amounts ranging from 0.1 to 10 wt % calculated on the total weight of the polymer.

The amount of 2,3-dihydroxy propyl methacrylate can vary between 5 and 50 mole % of the total monomer weight, but it is preferred to have more than 20 mole % of the cross-linker present in the monomer mixture. When more than 20 mole % of the cross-linker is used, layers of excellent quality, i.e., without cracks, can be obtained.

In the case of the compounds according to formula 1, the crux of the matter is that they have a proper leaving group adjacent to the carbonyl group. Since the compounds according to formula 1 must be divalent, they will always contain two leaving groups. If there is only one carbonyl group, the two leaving groups are bonded to the same carbonyl group. This is found in the case of, e.g., phosgene or diphenyl carbonate. Suitable compounds according to formula 1 having more than one carboxyl group include bischloroformates of diols, such as described in *Encyclopedia of Chemical Technology* Vol. 18 (3rd ed.), pp. 491–492, and Wiley & Sons, *Encyclopedia of Polymer Science and Engineering* Vol 11, pp. 680–687, notably bisphenol A, hydroquinone, halogenated bisphenol A, for instance tetrabromobisphenol A, 2,2-bis(4-hydroxyphenyl)1,1,1,3,3,3-hexafluoropropane, 2,2-bis(4-hydroxy-3,5-dibromophenyl) 1,1,1,3,3,3-hexafluoropropane, bisphenol S, and oligomers thereof. Preparation of the bischloroformates can be via the base catalysed reaction of the diol in question with phosgene or carbonyl imidazole. Generally, the diols are dissolved in THFor toluene, and phosgene is added slowly at 0° C., followed by the slow addition of the base. If the starting monomer used is diphenyl carbonate, the polycarbonate can be obtained by means of transesterification. In general, this requires the addition of diols into the monomer mixture. Diols are also included in the monomer mixture if the total amount of dihydroxy compounds (cross-linker and NLO-compound) is less than 50 mole %. Preferred diols are aromatic diols, most preferred are the diols which are also used as precursor of bischloroformates according to formula 1.

The polycarbonates are obtained by polymerising compounds according to formula 1 in a basic solvent such as pyridine or THF containing a tertiary amine, optionally dihydroxy functionalised NLO-compounds or other diols, 2,3-dihydroxy propyl methacrylate, and initiator.

For setting the molecular weight a quantity of chain stopper may be added, e.g., phenol. For further details with regard to the preparation of polycarbonates reference may be had to *Comp. Pol. Sci.: The Synthesis, Characterization, Reactions and Applications of Polymers* Vol. 5 (Pergamon Press), Chapter 20, pp. 345–356.

Within this framework, particular preference is given to polycarbonates based on halogenated bischloroformates: they were found to give an exceptionally low loss of signal. Generally speaking, preference is given to polycarbonates which have had their non-aromatic C—H-groups replaced by C-halogen groups at least in part, since they absorb less light in the waveband of 1300–1600 nm. In addition, replacing aromatic C—H bonds with C-halogen bonds makes for an increase in Tg. Furthermore, the refractive index of the polycarbonates according to the invention can be set very accurately by varying the amount of fluoro and bromo atoms in the compounds according to formula 1. The amount of fluoro atoms is increased to lower the refractive index, while the amount of bromo atoms is increased to obtain a higher refractive index. It is known to the artisan which other compounds according to formula 1 can be used to either increase or decrease the refractive index. Examples of suitable compounds according to formula 1 to increase the refractive index are dihydroxyphenyl diphenylmethane, bisphenol S, 2,2-bis(4-hydroxy-3,5-dibromophenyl)-1,1,1,3,3,3-hexafluoropropane, 2,2-bis(4-hydroxy-3,5-dichlorophenyl)-1,1,1,3,3,3-hexafluoropropane, phenolphtalein, tetrachloro phenolphtalein, and bischloroformates thereof. Examples of suitable groups to decrease the refractive index are 2,2-bis(4-hydroxyphenyl)-1,1,1,3,3,3-hexafluoropropane, octafluorodihydroxybiphenyl, 1,4-bis(2-hydroxyl,1,1,3,3,3-hexafluorpropyl)benzene, 2,2,3,3,4,4,5,5-octafluorohexane 1,6 diol, 2,2,3,3,4,4,5,5,6,6,7,7-dodecafluoro 1,8 diol, 1H,1H,10H,10H-perfluorodecane 1,10 diol.

In order to reduce stress building up in the various layers, flexibel diols may be introduced in the monomer mixture. Halogenated diols such as 2,2,3,3,4,4,5,5,-octafluoro 1,6 dihydroxyhexane are preferred. Optical components comprising polycarbonate built up from a monomixture comprising these flexibel diols appear to have less cracks.

Another measure to reduce the cracks in the layers is to increase the cross-link density even further. This can be done by mixing separate cross-linkers into the monomer mixture. Suitable cross-linkers are Diacryl 100 ® and 101 ®, ex Akzo Nobel Chemicals, and luorinated derivatives thereof.

After being dissolved in an appropriate solvent and optionally adding of initiator, the polycarbonates can be applied onto a substrate by means of spincoating. Suitable solvents are those which meet the following requirements: firstly, of course, the polycarbonate has to be soluble in the solvent. Further, the solvent should properly wet the substrate. The resulting polymer solution has to be filterable for efficient spincoating. As solvents which meet these requirements for silicon or glass substrates may be mentioned THF, o-xylene mesitylene, γ-butyrolactone, ethylene glycol diacetate, diglyme, cyclohexyl acetate, tetrachloroethane, cyclopentanone, 2-methylcyclohexanone, 2-methoxy ethylacetate. After spincoating the solvent is evaporated at elevated temperature. Thermal curing is preferred beause the layers have to be heated in any case to evaporate the spincoating solvent. Accordingly, with thermal curing no additional fabrication step is introduced.

The invention is also directed to optical components comprising the cross-linkable or cross-linked optical polycarbonates according to the invention. Said optical components have a multilayer polymer structure on a substrate of at least:

a) a low refractive index lower cladding layer, b) a high refractive index core layer, c) a low refractive index upper cladding layer, the layers a, b, and c being made of polycarbonate according to the invention.

As is indicated above, is it necessary to obtain a specific layer structure with each layer having a specific refractive index. Optimal transversal confinement can be obtained with a multilayer structure comprising an at least penta-layered structure on a substrate comprising a low refractive index lower cladding layer A, a core-matching refractive index lower cladding layer B, a core layer C, a core-matching refractive index upper cladding layer D, and a low refractive index upper cladding layer E.

The optimal transversal confinement thus obtained makes it possible to create optical components with a minimal loss of light.

Typical layer thicknesses and typical refractive indices of the various layers are given below in TABLE I.

TABLE I

| layer | thickness ($\mu$m) | refractive index |
| --- | --- | --- |
| E | 4–8 | 1.4–1.48 |
| D | 0–4 | 1.50–1.52 |
| C | 4–8 | 1.51–1.525 |
| B | 6–8 | 1.50–1.52 |
| A | 2–4 | 1.4–1.48 |

Lateral confinement can be achieved by all known methods for defining channels in planar waveguiding components. Suitable methods are:

1. shaping the core layer by etching techniques (for instance reactive ion etching with oxygen plasma) to obtain a buried channel waveguide, 2. bleaching of the core layer to obtain a buried channel waveguide, 3. shaping of either of the core-matching refractive index upper or lower cladding layers B or D to obtain a ridge (strip loaded) or an inverted ridge waveguide, 4. bleaching of either of the core-matching refractive index upper or lower cladding layers B or D to obtain a ridge (strip loaded) or an inverted ridge waveguide.

All these techniques are known to the artisan and need no further elucidation here. When using technique 1, the core layer is etched away, only leaving the channel waveguide. Subsequently, matching refractive index upper cladding material is applied both on top of the core layer C and onto the areas where the core material was etched partly away. This technique and also technique 2 are preferred because they can result in symmetrical channel waveguides. Symmetrical channel waveguides show low polarisation dependence of the modal properties. When the bleaching technique is used, the refractive index of the core-matching refractive index cladding layers B and D should be adapted to the refractive index of the bleached parts of the core.

Polycarbonates suitable for the bleaching technique can be obtained by incorporating bleachable diols into the monomer mixture. Examples of bleachable diols are given in EP-A1-0 645 413, U.S. Pat. No. 5,142,605, and in EP appln. No. 94202319.3.

When the shaping of the core technique is used, the refractive index of the core-matching refractive index upper cladding layer material is chosen such as to give the required properties, such as: monomode behaviour, good overlap with a Standard Single Mode Fibre (SMF), polarisation dependence, low bend losses.

By optical components are meant here, thermo-optical components, electro-optical components or passive components.

Both thermo-optical and electro-optical components are known. The working of thermo-optical components is based on the phenomenon of the optical waveguide material employed exhibiting a temperature dependent refractive index. On top of the upper cladding layer of the thermo-optical component are provided heating elements (usually metal strips) to heat the polymeric cladding and core material, in order to change the refractive index for switching.

The working of electro-optical devices is based on the phenomenon of the non-linear optically active material employed exhibiting an electric field dependent refractive index. In the case of electro-optical components the core layer of the component comprises non-linear optically active material. On top of the upper cladding layer electrodes are provided to apply an electric field to the non-linear optically active material to change the refractive index for switching.

The polycarbonates according to the invention suitable for use as core layer material in electro-optical components are non-linear optically active polycarbonates. Said polycarbonates are obtained by including dihydroxy-fuctionalised NLO-compounds in the monomer mixture. In NLO-polymers non-linear polarisation occurs under the influence of an external field of force (such as an electric field). Non-linear electric polarisation may give rise to several optically non-linear phenomena, such as frequency doubling, Pockels effect, and Kerr effect. In order to render polymeric non-linear optical material active (obtain the desired NLO effect macroscopically), the groups present in the polymer first have to be aligned (poled). Such alignment is commonly effected by exposing the polymeric material to electric (DC) voltage, the so-called poling field, with such heating as will render the polymeric chains sufficiently mobile for orientation. Dihydroxy-fuctionalised NLO compounds suitable for introduction into the cross-linkable or cross-linked polycarbonates according to the invention are described in EP-A1-0 645 413, U.S. Pat. No. 5,208,299, and EP application No. 9500598.1.

For the cladding layers the same material can be used as in thermo-optical components.

The invention will be further illustrated by the following unlimitative examples.

EXAMPLES

Example 1 general polymerisation procedure

To a well stirred mixture of 50 mole % of compound according to formula 1, 50 mole % diols are added in THF. The diols comprise cross-linker, and optionally other diols. A pyridine solution in THF was added dropwise, while the temperature was kept within the temperature range of 0–10° C. After 4 hours the reaction product was precipitated in methanol.

Example 2

Polycarbonate 1 was prepared by polymerising 50 mole % of bischloroformate of 2,2-bis(4-hydroxyphenyl)-1,1,1,3,3,3-hexafluoropropane, 25 mole % 2,2-bis(4-hydroxyphenyl)-1,1,1,3,3,3-hexafluoropropane, and 25 mole % of 2,3-dihydroxypropyl methacrylate.

The properties of the polycarbonate are given in TABLE II. This material was used for low refractive index cladding layers A and E both in a thermo-optical component described below.

Example 3

Polycarbonate 2 was prepared by polymerising 25 mole % of 2,3-dihydroxypropyl methacrylate, 40 mole % of bischloroformate of 2,2,-bis(4-hydroxy-3,5-dibromophenyl)-1,1,1,3,3,3-hexafluoro-propane, , 25 mole % of 2,2-bis(4-hydroxyphenyl)-1,1,1,3,3,3,-hexafluoropropane, and 10 mole % of bischloroformate of 2,2-bis(4-hydroxyphenyl)-1,1,1,3,3,3,-hexafluoropropane.

The properties of the polycarbonate are given in TABLE II. This material was used for core-matching refractive index cladding layers B and D both in a thermo-optical component described below.

Example 4

Polycarbonate 3 was prepared by polymerising 25 wt % of 2,3-dihydroxypropyl methacrylate, 50 wt % of bischloroformate of 2,2-bis(4-hydroxy-3,5-dibromophenyl)-1,1,1,3,3,3-hexafluoro-propane, and 25 wt % of 2,2-bis(4hydroxyphenyl)-1,1,1,3,3,3-hexafluoropropane.

The properties of the polycarbonate are given in TABLE II. This material was used as core material of a thermo-optical component described below.

Examples 5–16

Other polycarbonates were prepared according to the same procedure as described above. In TABLE II the compounds according to formula 1, their molecular weight, the Tg before curing, and the Tg after curing are given. The following abbreviations are used for the monomers used:

F6 (bischloroformate of) 2,2-bis(4-hydroxyphenyl)-1,1,1,3,3,3-hexafluoropropane, Br4 (bischloroformate of) 2,2,-bis(4-hydroxy-3,5-dibromophenyl)-1,1,1,3,3,3-hexafluoro-propane, SDP sulphonyl diphenol (bisfenol S), DPMA 2,3 -dihydroxypropyl-methacrylate, DACS diethanol amino cyano stilbene, F8 2,2,3,3,4,4,5,5,octafluoro 1,6-dihydroxyhexane, DA-100 ® Diacryl 100 ®, ex Akzo Nobel Chemicals, F6-DA fluorinated (at the isopropyl group) DA-100.

TABLE II

| No. | DPMA (mole %) | monomers used (mole %) | M.W. | Tg | Tg (after cure) |
|---|---|---|---|---|---|
| 1 | 25 | F6(75) | 46000 | 110/116 | 119/179**) |
| 2 | 25 | F6(35)/Br4(40) | 30000 | 149/157 | 160/191 |
| 3 | 25 | F6(25)/Br4(50) | 23000 | 157/165 | 176/198 |
| 4 | 5 | F6(45)/Br4(50) | 20200 | 178/187 | 155/179 |
| 5 | 10 | F6(40)/Br4(50) | 25500 | | |
| 6 | 30 | F6(35)/Br4(35) | 61200 | 137/147 | 166/189 |
| 7 | 20 | F6(80) | 29000 | | |

TABLE II-continued

| No. | DPMA (mole %) | monomers used (mole %) | M.W. | Tg | Tg (after cure) |
|---|---|---|---|---|---|
| 8 | 20 | F6(60)/Br4(20) | 19000 | | |
| 9 | 25 | F6(55)/Br4(20) | 57300 | 135/142 | |
| 10 | 25 | F6(20)/Br4(55) | 40500 | 163/174 | |
| 11 | 20 | F6(65)/DACS(15) | 52000 | 116/122 | |
| 12 | 20 | F6(60)/DACS(20) | 21000 | 112/118 | 107/120 |
| 13 | 25 | F6(50)/SDP(25) | 15000 | | |
| 14* | 0 | F6(50)/SDP(50) | 14000 | 158/167 | — |
| 15* | 0 | F6(100) | | | |
| 16* | 0 | F6(50)/Br4(50) | | | |
| 17 | 25 | F6(50)/F8(25) | | | |
| 18 | 25 | F6(10)/Br4(40)/F8(25) | | | 102/150 |
| 19 | 25 | Br4(50)/F8(25) | | | 134/162 |

**)Two Tgs were observed 129/160 and 160/179

The polycarbonates marked with * are comparative examples without a cross-linker. All the polycarbonates were spincoated into films from cyclohexyl acetate or cyclopentanone onto a silicon substrate. Upon heating to 170° C. the solvent was evaporated and the film cured. It proved impossible to spincoat layer-on-layer with the polycarbonates without cross-linker. The polycarbonates containing less than 20 mole % of cross-linker still appeared to have small cracks when spincoating layer-on-layer. The polycarbonates containing 20 mole % of cross-linker or more all were of excellent quality without hardly any cracks. The polycarbonates containing F8 appeared to have a lower aTg after curing compared with the analoguous F6 polycarbonates. This resulted in films with even higher quality and less cracks. The light loss was measured on the films by means of the prism incoupling technique as described in EP-A1-0 645 413. The polycarbonates containing DACS were also bleached. The refractive indices of all fims were measured (also the bleached films). The results are compiled in TABLE III.

TABLE III

| | loss | | refractive index | |
|---|---|---|---|---|
| No. | at 1305 nm | at 1565 nm | at 1305 nm | at 1565 nm |
| 1 | <0.1 | | 1.4877 | 1.4861 |
| 2 | <0.1 | <0.1 | 1.5092 | 1.5074 |
| 3 | <0.1 | <0.1 | 1.5147 | 1.5131 |
| 4 | | | | |
| 5 | | | | |
| 6 | <0.1 | 0.1 | 1.523 | 1.524 |
| 7 | | | | |
| 8 | | | | |
| 9 | <0.1 | <0.1 | 1.5127 | 1.5128 |
| 10 | <0.1 | <0.1 | 1.536 | 1.537 |
| 11 | <0.1 | 0.35 | 1.549 | 1.551 |
| 11(blea) | | | 1.538 | 1.540 |
| 12 | <0.1 | 0.15 | 1.548 | 1.548 |
| 12(blea) | | | 1.536 | 1.537 |
| 13 | <0.1 | 0.16 | 1.526 | 1.5258 |
| 14* | no layer-on-layer spincoating possible | | | |
| 15* | no layer-on-layer spincoating possible | | | |
| 16* | no layer-on-layer spincoating possible | | | |
| 17 | | | | 1.469 |
| 18 | | | | 1.4987 |
| 19 | | | | 1.5057 |

Also polycarbonates were prepared having cross-linkers in addition to DPMA (25 mole %). The results are compiled in TABLE IV, whrein R.I. stands for the refractive index.

TABLE IV

| No. | X-linker | monomers used | Tg after cure | R.I |
|---|---|---|---|---|
| 20 | F6-DA | F6(75) | 131/169 | 1.4865 |
| 21 | DA-100 | F6(75) | | 1.4918 |
| 22 | F6-DA | F6(25)/Br4(50) | 153/186 | 1.5085 |
| 23 | DA-100 | F6(25)/Br4(50) | 148/173 | 1.5137 |

A thermo-optical component was prepared by spincoating layers of polycarbonate 1 (layers A and E), polycarbonate 2 (layers B and D), and polycarbonate 3 (layer C) onto a silicon substrate. The channels were defined by reactive ion etching with oxygen plasma. On top of the upper cladding layer a heater strip made up of a thin Cr-layer and an Au-layer was applied, provided with 3–5 μm thick bonding pads. The thermo-optical device was pigtailed with Standard Single Mode Fibres. The properties of the various layers are depicted in TABLE V.

TABLE V

| layer | thickness (μm) | refractive index at 1305 nm | (TE) at 1565 nm |
|---|---|---|---|
| A | 4.1 | 1.4877 | 1.4861 |
| B | 8.1 | 1.5092 | 1.5074 |
| C | 5.5 | 1.5147 | 1.5131 |
| D | 2.9 | 1.5092 | 1.5074 |
| E | 6.2 | 1.4877 | 1.4861 |

The thermo-optical component was found to have a low insertion loss of less than 2 dB, a switching power of less than 100 mW, a cross-talk of −20 dB. The switching time was as low as 1 ms and the polarisation dependence less than 0.3 dB.

We claim:

1. Cross-linkable or cross-linked polycarbonate obtained from a monomer mixture comprising:

compounds according to formula 1:

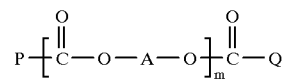

formula 1 wherein: P stands for —Cl, O—R, an imidazole group or —O—Ph,

Q stands for —Cl, O—R, an imidazole group or —O—Ph,

R stands for an alkylene group having 1–6 carbon atoms,

Ph stands for phenyl,

A stands for —Ph—, halogenated —Ph—, (halo)alkyl substituted —Ph, —Ph—Ph—, halogenated —Ph—Ph, —Ph—C(CH$_3$)$_2$—Ph—, —Ph—SO$_2$—Ph—, —Ph—C(CF$_3$)$_2$—Ph—, halogenated —Ph—C(CH$_3$)$_2$—Ph, halogenated —Ph—C(CF$_3$)$_2$—Ph, phenolphtalein, —Ph—C(Ph)$_2$—Ph, m is an integer from 0 to 5, with the A-groups being the same or different, optionally, diols, optionally, a dihydroxy-functionalised NLO-compound, and 2,3 dihydroxy propyl methacrylate as a crosslinker.

2. Optical component having a multilayer polymer structure on a substrate of at least:

a) a low refractive index lower cladding layer, b) a high refractive index core layer, c) a low refractive index upper cladding layer,
wherein the layers a, b, and c are made of a polycarbonate according to either of the preceding claims.

3. Optical component according to claim 2 wherein the optical component comprises an at least penta-layered structure on a substrate comprising a low refractive index lower cladding layer, a core-matching refractive index lower cladding layer, a core layer, a core-matching refractive index upper cladding layer, and a low refractive index upper cladding layer.

4. Optical component according to claim 2 wherein the optical component is a thermo-optical component.

5. Optical component according to claim 2 wherein the optical component is an electro-optical component.

6. Optical component according to claim 3 wherein the core layer and the core-matching refractive index cladding layers comprise polycarbonates or bischloroformates of 2,2-bis(4-hydroxyphenyl)1,1,1,3,3,3-hexafluoropropane and 2,2-bis(4-hydroxy-3,5-dibromophenyl)1,1,1,3,3,3-hexafluoropropane and 2,3-dihydroxy propyl methacrylate, and the low refractive index cladding layers comprise a 2,2-bis(4-hydroxyphenyl)1,1,1,3,3,3-hexafluoropropane and 2,3-dihydroxy propyl methacrylate.

7. Cross-linkable or cross-linked polycarbonate according to claim 1 comprising a compound of formula 1, optionally a diol, and optionally a dihydroxy functionalized NLO-compound, the remainder being more than 20% of 2,3-dihydroxypropyl methacrylate.

8. A method for the preparation of the optical component of any one of claims 2–6 wherein the various layers are spin-coated onto a substrate from a solution of the polycarbonate and a solvent in which the polycarbonate is soluble and which wets the substrate, after which the solvent is evaporated at elevated temperature, and the layer is cured.

* * * * *